(12) United States Patent
Stegemann et al.

(10) Patent No.: US 11,353,919 B2
(45) Date of Patent: Jun. 7, 2022

(54) DISPLAY ASSEMBLY

(71) Applicant: VISTEON GLOBAL TECHNOLOGIES, INC., Van Buren Township, MI (US)

(72) Inventors: Mathias Stegemann, Munich (DE); Manfred Süss, Remchingen (DE); Emil Volodiev Tsanin, Sofia (BG); Shenol Ilyaz Hasan, Sofia (BG); Aleksandar Georgiev Lukanov, Sofia (BG)

(73) Assignee: Visteon Global Technologies, Inc., Van Buren Township, MI (US)

( * ) Notice: Subject to any disclaimer, the term of this patent is extended or adjusted under 35 U.S.C. 154(b) by 288 days.

(21) Appl. No.: 16/732,837

(22) Filed: Jan. 2, 2020

(65) Prior Publication Data

US 2021/0089076 A1   Mar. 25, 2021

Related U.S. Application Data

(60) Provisional application No. 62/902,608, filed on Sep. 19, 2019.

(51) Int. Cl.
| | |
|---|---|
| *H04N 5/64* | (2006.01) |
| *G06F 1/16* | (2006.01) |
| *B60K 35/00* | (2006.01) |
| *H04N 5/77* | (2006.01) |

(52) U.S. Cl.
CPC ............ *G06F 1/1601* (2013.01); *B60K 35/00* (2013.01); *B60K 2370/67* (2019.05)

(58) Field of Classification Search
CPC .... G06F 1/1652; G06F 1/1601; G06F 1/1656; G06F 1/1681; G06F 1/1801; B60K 35/00; B60K 2370/1533; B60K 2370/691; B60K 2370/693; B60K 2370/67; B60K 2370/688
USPC ............... 348/837, 805, 808, 825, 836, 840; 386/219, 358, 359
See application file for complete search history.

(56) References Cited

U.S. PATENT DOCUMENTS

| | | | |
|---|---|---|---|
| 9,585,265 B2* | 2/2017 | Ganim | ............... G06Q 30/0265 |
| 2020/0233451 A1* | 7/2020 | Hong | .................... G06F 1/1667 |

FOREIGN PATENT DOCUMENTS

| | | | |
|---|---|---|---|
| CA | 2871051 A1 * | 5/2015 | |
| EP | 3451115 A1 * | 6/2019 | |

* cited by examiner

*Primary Examiner* — Robert Chevalier
(74) *Attorney, Agent, or Firm* — Quinn IP Law

(57) ABSTRACT

A compliant display assembly employing a glass outer screen is configured to permit bending of the glass outer screen without buckling or cracking. The compliant display assembly includes a planar glass sheet, a first planar housing, a second planar housing, and a hinge, wherein the first planar housing is pivotably coupled to the second planar housing via the hinge. The planar glass sheet is attached to the first and second planar housings. The first planar housing is arranged to pivot relative to the second planar housing via the hinge. The hinge is arranged to limit the pivot angle between the first planar housing and the second planar housing to a maximum pivot angle. The hinge is arranged to secure the first planar housing in relation to the second planar housing.

20 Claims, 4 Drawing Sheets

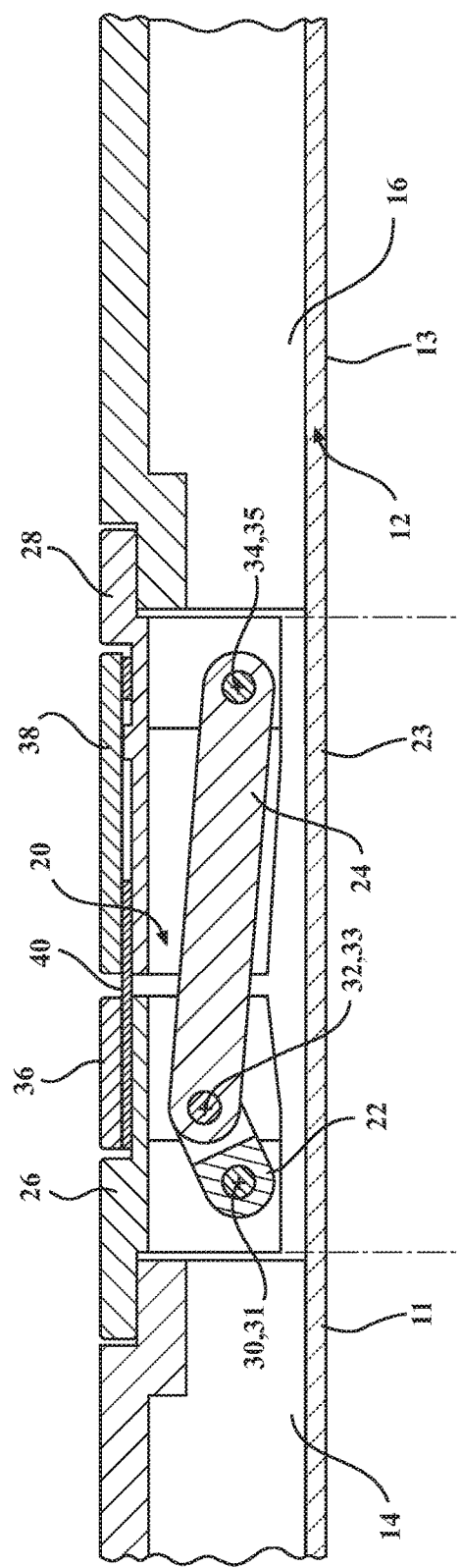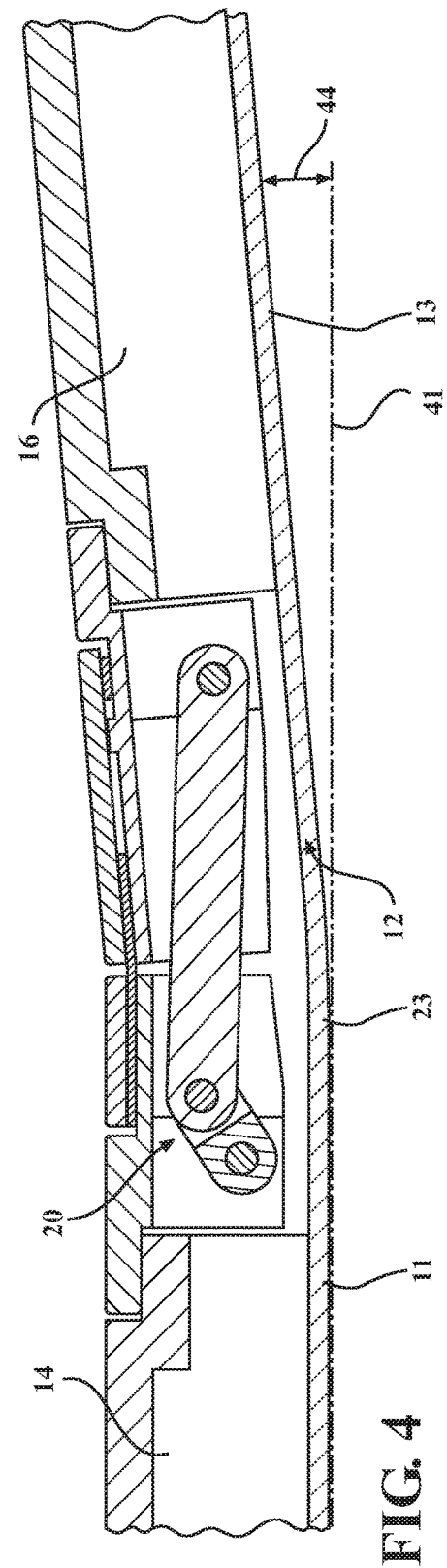

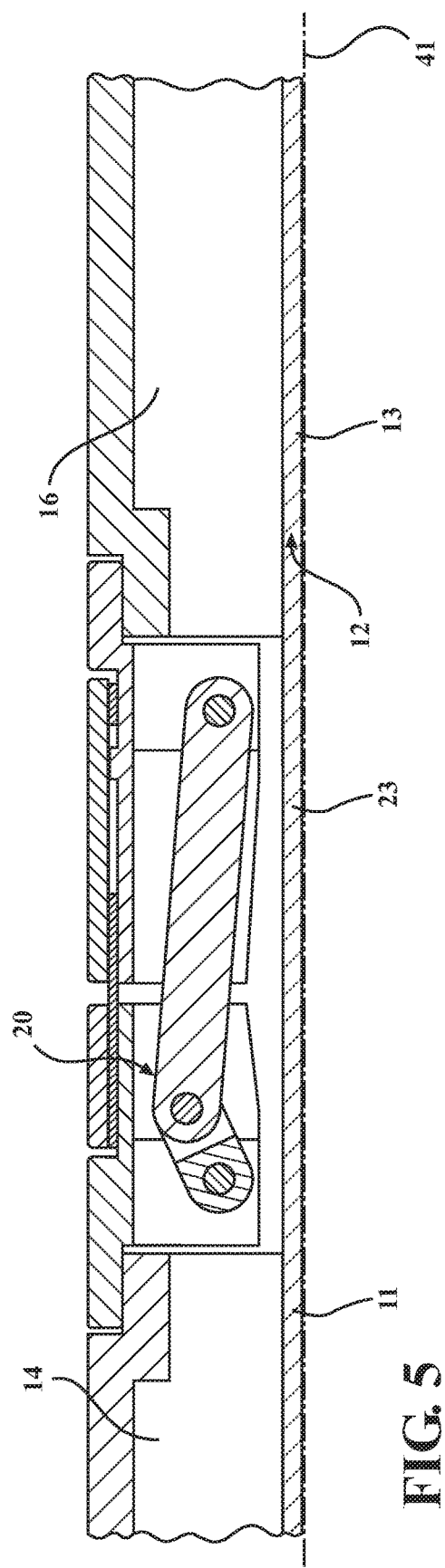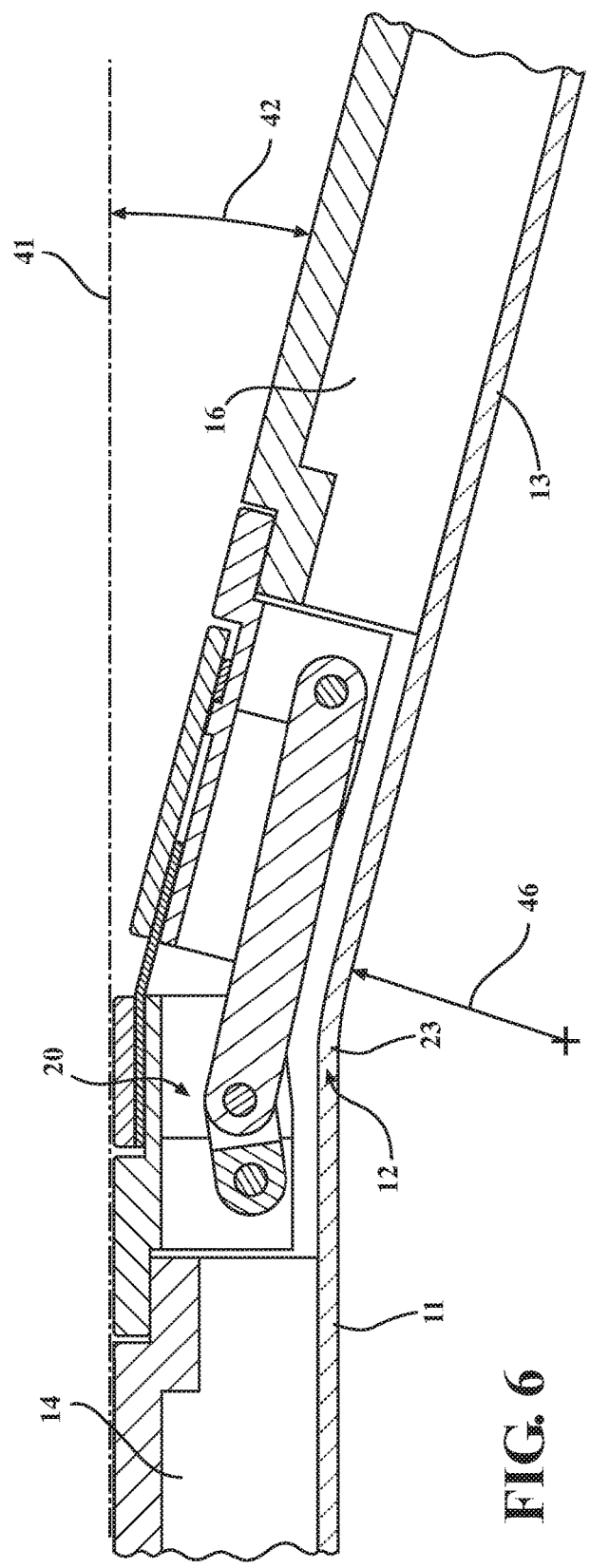

DISPLAY ASSEMBLY

CROSS-REFERENCE TO RELATED APPLICATIONS

This application claims the benefit of U.S. Provisional Patent Application No. 62/902,608 filed on Sep. 19, 2019, the disclosure of which is hereby incorporated by reference.

TECHNICAL FIELD

The present disclosure generally relates to on-vehicle display assemblies, and methods for forming display assemblies.

BACKGROUND

Display assemblies are used to present images and video to one or a plurality of viewers. Display assemblies can include a display panel and may also include a lens extending parallel to the display panel. Specific applications of display panels may include instrument clusters or infotainment systems in vehicles, for example. Such display panels can provide the driver and/or passengers of a vehicle with useful information for operating the vehicle and/or for entertainment.

SUMMARY

A compliant display assembly employing a glass outer screen is described. The compliant display assembly is configured to permit bending of the glass outer screen without buckling or cracking. The compliant display assembly includes a planar glass sheet, a first planar housing, a second planar housing, and a multi-link hinge assembly, wherein the first planar housing is pivotably coupled to the second planar housing via the multi-link hinge assembly. The planar glass sheet is attached to the first planar housing and is attached to the second planar housing. The first planar housing is arranged to pivot in a first direction relative to the second planar housing via the multi-link hinge assembly and is arranged to pivot in a second direction relative to the second planar housing via the multi-link hinge assembly. The multi-link hinge assembly is arranged to limit the pivot angle between the first planar housing and the second planar housing to a maximum pivot angle. The multi-link hinge assembly is arranged to secure the first planar housing in relation to the second planar housing.

An aspect of the disclosure includes the multi-link hinge assembly being arranged to limit the pivot angle between the first planar housing and the second planar housing to a maximum positive pivot angle in the first direction, and the multi-link hinge assembly being arranged to limit the pivot angle between the first planar housing and the second planar housing to a maximum negative pivot angle in the second direction.

Another aspect of the disclosure includes the planar glass sheet having a first thickness, and wherein the multi-link hinge assembly is arranged to limit the magnitude of the pivot angle between the first planar housing and the second planar housing to the maximum pivot angle based upon the first thickness.

Another aspect of the disclosure includes the planar glass sheet having a first thickness of 0.7 mm, and wherein the multi-link hinge assembly is arranged to limit the magnitude of the pivot angle between the first planar housing and the second planar housing to a maximum pivot angle of −5° of rotation in a first direction and a maximum pivot angle of +15° of rotation in a second direction.

Another aspect of the disclosure includes the multi-link hinge assembly being arranged to permit bending of the planar glass sheet without buckling.

Another aspect of the disclosure includes the maximum pivot angle being determined based upon a minimum bending radius of the planar glass sheet.

Another aspect of the disclosure includes a first electronic display device being interposed between a first portion of the planar glass sheet and the first planar housing, and a second electronic display device being interposed between a second portion of the planar glass sheet and the second planar housing.

Another aspect of the disclosure includes the multi-link hinge assembly being interposed between the first planar housing and the second planar housing, and wherein a magnitude of width of the multi-link hinge assembly is determined based upon a minimum bending radius of the planar glass sheet.

Another aspect of the disclosure includes the multi-link hinge assembly including a first link, a second link, a first holder, a second holder, a first clamp, a second clamp, and a slider element, wherein the first holder is attached to the first planar housing, wherein the second holder is attached to the second planar housing, wherein the first link is pivotably attached to the first holder at a first axis of rotation, wherein the first link is pivotably attached to the second link at a second axis of rotation, wherein the second link is pivotably attached to the second holder at a third axis of rotation, wherein the slider element is attached to the first holder via a first clamp, wherein the slider element is slidably disposed on the second holder via a second clamp, and wherein the slider element, the second holder and the second clamp interact to secure the first planar housing in relation to the second planar housing.

Another aspect of the disclosure includes the multi-link hinge assembly including a mechanism arranged to limit the magnitude of the pivot angle between the first planar housing and the second planar housing.

Another aspect of the disclosure includes the mechanism arranged to limit the magnitude of the pivot angle between the first planar housing and the second planar housing including a pin slidably disposed in a slot, wherein the pin is disposed on the second clamp and the slot is disposed on the slider element.

Another aspect of the disclosure includes the planar glass sheet including a single planar glass sheet, wherein a first portion of the single planar glass sheet is attached to the first planar housing, and wherein a second portion of the single planar glass sheet is attached to the second planar housing.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIG. 3 is a top view of a portion of an embodiment of a compliant display assembly employing a glass outer screen that includes a first planar housing that is joined to a second planar housing via a multi-link hinge assembly, in accordance with the disclosure.

FIG. 4 is a top view of a portion of an embodiment of a compliant display assembly employing a planar glass sheet, wherein a first planar housing is joined to a second planar housing via a multi-link hinge assembly and is arranged at a negative rotation relative to a neutral plane, in accordance with the disclosure.

FIG. 5 is a top view of a portion of an embodiment of a compliant display assembly employing a planar glass sheet, wherein a first planar housing is joined to a second planar housing via a multi-link hinge assembly and is arranged at zero rotation relative to a neutral plane, in accordance with the disclosure.

FIG. 6 is a top view of a portion of an embodiment of a compliant display assembly employing a planar glass sheet, wherein a first planar housing is joined to a second planar housing via a multi-link hinge assembly and is arranged at a positive rotation relative to a neutral plane, in accordance with the disclosure.

The appended drawings are not necessarily to scale and may present a somewhat simplified representation of various features of the present disclosure as disclosed herein, including, for example, specific dimensions, orientations, locations, and shapes. Details associated with such features will be determined in part by the particular intended application and use environment. Novel aspects of this disclosure are not limited to the particular forms illustrated in the above-enumerated drawings. Rather, the disclosure includes modifications, equivalents, and combinations falling within the scope of the disclosure.

DETAILED DESCRIPTION

The components of the disclosed embodiments, as described and illustrated herein, may be arranged and designed in a variety of different configurations. Thus, the following detailed description is not intended to limit the scope of the disclosure but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as inner, outer, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
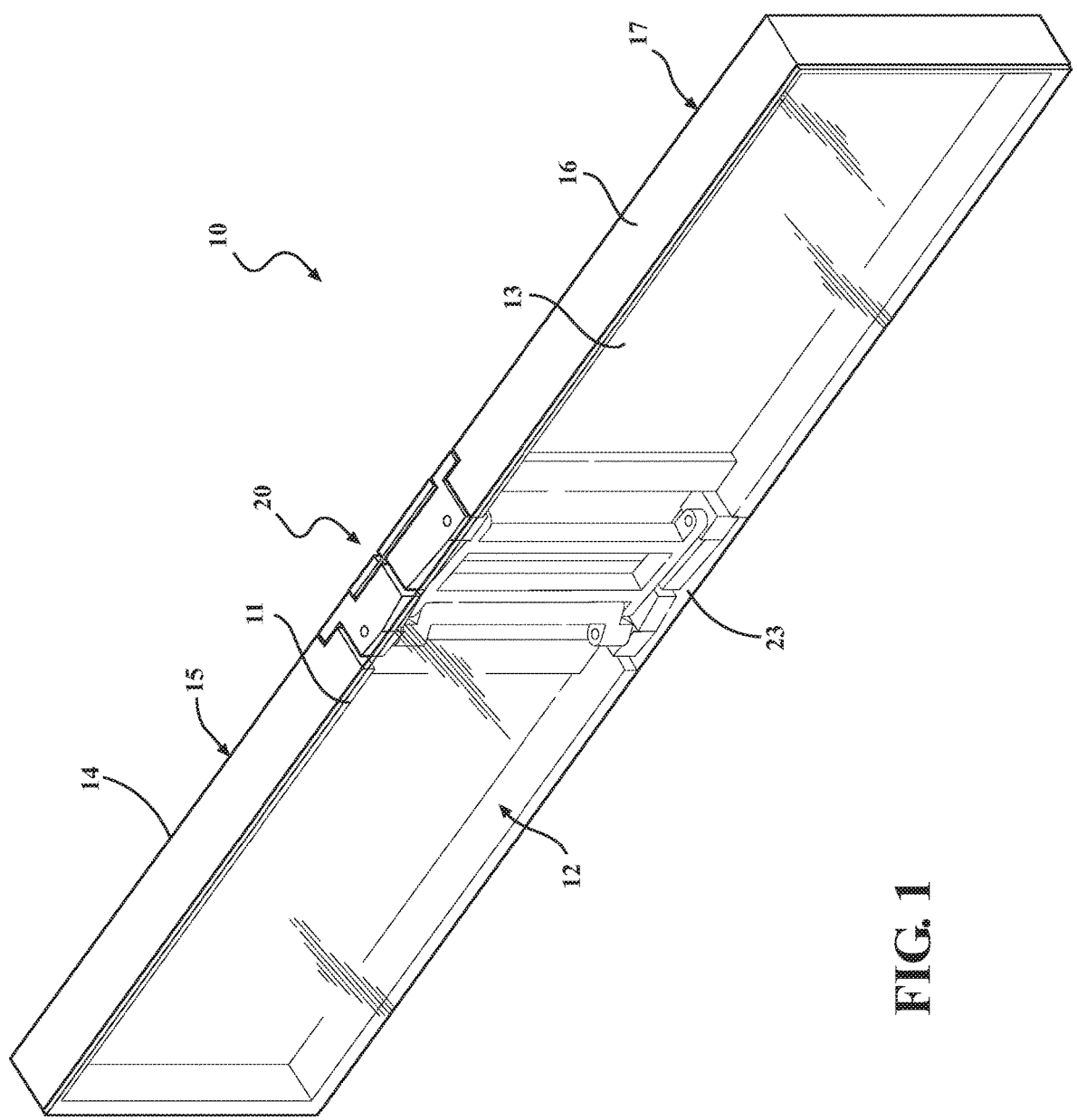
FIG. 1 is an isometric front top view of an embodiment of a compliant display assembly employing a glass outer screen that includes a first planar housing that is joined to a second planar housing via a multi-link hinge assembly, in accordance with the disclosure.
Figure 2:
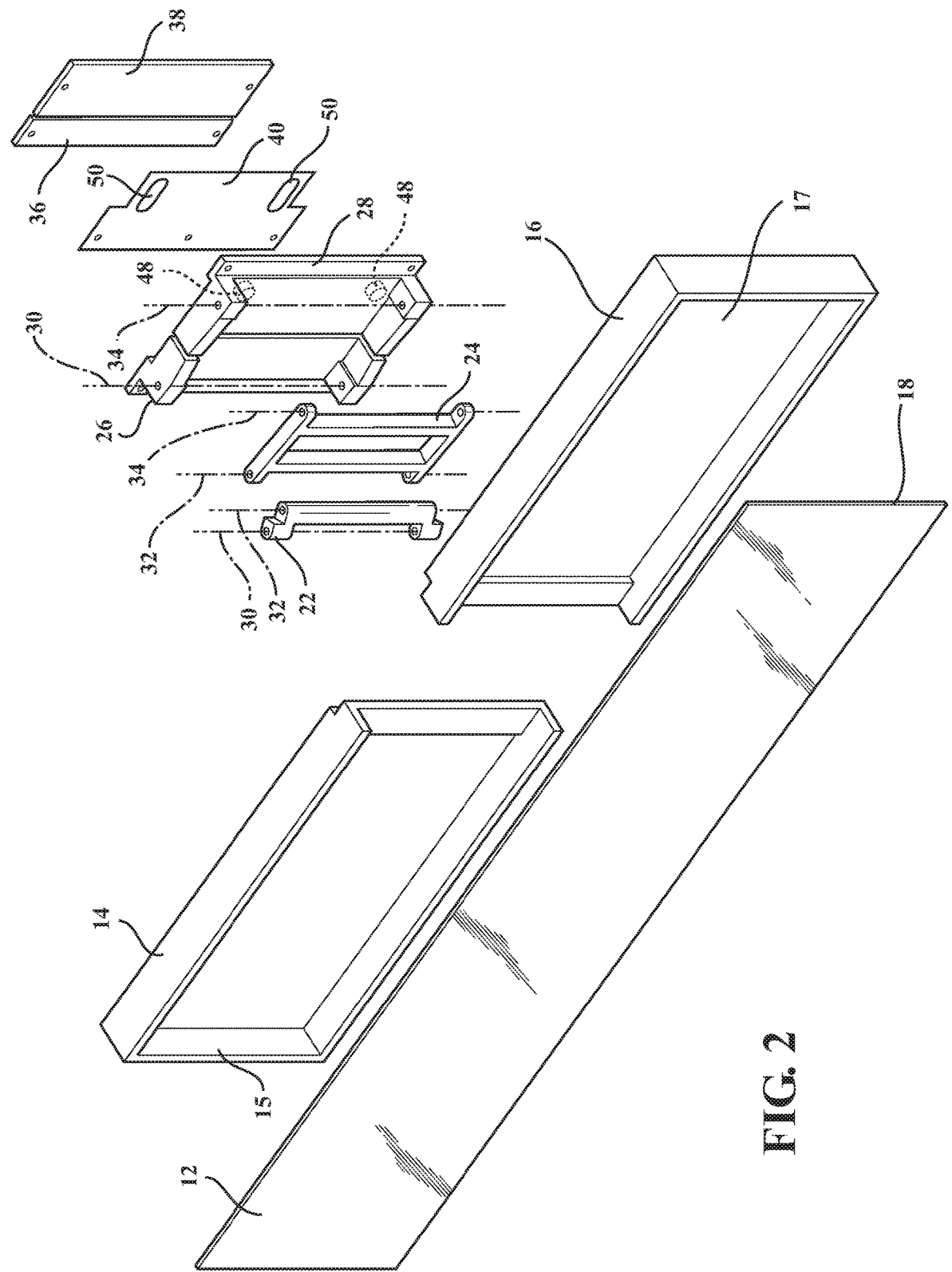
FIG. 2 is an isometric front exploded view of an embodiment of a compliant display assembly employing a glass outer screen that includes a first planar housing that is joined to a second planar housing via a multi-link hinge assembly, in accordance with the disclosure.

Referring to the Figures, wherein like numerals indicate like parts throughout the several views, FIGS. 1, 2 and 3 schematically show aspects of a compliant display assembly 10 including a planar glass sheet 12, a first planar housing 14, a second planar housing 16, and a multi-link hinge assembly 20. The compliant display assembly 10 is arranged to provide mounting structure for a plurality of electronic display panels, including, e.g., first and second display panels 15, 17, respectively, as shown. The compliant display assembly 10 may be disposed on a vehicle (not shown) to provide visual and/or audiovisual information to vehicle occupants via the first and second display panels 15, 17. In one embodiment, the first and second display panels 15, 17 are flat-panel displays that employ LCD (liquid crystal display) technology, LED (light-emitting diode) technology, OLED (Organic light-emitting diode) technology, or another display technology, and may be employed to display information related to an instrument cluster and an infotainment system to vehicle occupants.

The first planar housing 14 and the second planar housing 16 are each fabricated from a rigid material, e.g., a thermoplastic material or a metal material. The first planar housing 14 and the second planar housing 16 may be arranged in a substantially vertical orientation in one embodiment. Alternatively, the first planar housing 14 and the second planar housing 16 may be arranged in a horizontal orientation, or a tilted orientation relative to a vertical plane. The first planar housing 14 and the second planar housing 16 may be disposed in a side-by-side arrangement, with the first planar housing 14 arranged co-planar to the second planar housing 16 in one embodiment. Alternatively, the first planar housing 14 may be arranged in a first plane that is parallel to a second plane that is defined by the second planar housing 16. The first planar housing 14 is pivotably coupled to the second planar housing 16 via the multi-link hinge assembly 20. In one embodiment, the first planar housing 14 is fixedly secured to a structural element of a vehicle.

The planar glass sheet 12 is in the form of a single, unitary, clear planar glass sheet 12 that is fabricated from mineral glass. The planar glass sheet 12 described as having a first portion 11, a flex portion 23, and a second portion 13. The planar glass sheet 12 has a uniform thickness 18 that is determined at least in part based upon a minimum bending radius and an expected range of pivoting between the first and second planar housings 14, 16. The minimum bending radius may be theoretically and/or empirically determined based upon design parameters of the planar glass sheet 12, and physical properties of the specific mineral glass, including its modulus of elasticity, hardness, strength, and toughness in combination with environmental factors and its expected application. The minimum bending radius is a bending radius that is selected to achieve elastic bending of the planar glass sheet 12 without exceeding elastic limits of the planar glass sheet 12 that may lead to fracturing, etc. In one embodiment, the uniform thickness 18 is 0.7 mm. The planar glass sheet 12 is attached to the compliant display assembly 10 with the first portion 11 being fixedly bonded to the first planar housing 14, the second portion 13 being fixedly bonded to the second planar housing 16, and the flex portion 23 being unattached.

The first planar housing 14 is arranged to pivot in a first direction from a neutral plane 41 relative to the second planar housing 16 via the multi-link hinge assembly 20, and is also arranged to pivot in a second, opposite direction from the neutral plane 41 relative to the second planar housing 16 via the multi-link hinge assembly 20.

As shown with reference to FIGS. 4, 5, and 6, the multi-link hinge assembly 20 is arranged to limit the pivot angle between the first planar housing 14 and the second planar housing 16 to a maximum pivot angle. The maximum pivot angle includes a maximum positive pivot angle 42 as measured from the neutral plane 41 in the first direction, and a maximum negative pivot angle 44 as measured from the neutral plane 41 in the second direction. Furthermore, the multi-link hinge assembly 20 is arranged to limit movement and thus secure the first planar housing 14 at a desired pivot angle in relation to the second planar housing 16.

Referring again to FIGS. 1-3, the multi-link hinge assembly 20 is interposed between the first planar housing 14 and the second planar housing 16, serving in part to separate the first planar housing 14 and the second planar housing 16 by a predefined width 21. A magnitude of the predefined width 21 of the multi-link hinge assembly 20 is determined based upon a minimum bending radius 46 of the planar glass sheet 12. A magnitude of the predefined width 21 may be in the order of magnitude of 60 mm when the minimum bending radius 46 is 250 mm, in one embodiment.

The multi-link hinge assembly 20 includes a first link 22, a second link 24, a first holder 26, a second holder 28, a first clamp 36, a second clamp 38, and a slider element 40. The first holder 26 is fixedly attached to a side portion of the first planar housing 14, and the second holder 28 is fixedly attached to an adjoining side portion of the second planar housing 16.

The first link 22 is pivotably attached to the first holder 26 at a first joint 31 that defines a first axis of rotation 30 and is also pivotably attached to the second link 24 at a second joint 33 that defines a second axis of rotation 32. The second link 24 is pivotably attached to the second holder 28 at a third joint 35 that defines a third axis of rotation 34. This arrangement of the first and second links 22, 24 to pivotably join the first holder 26 and the second holder 28 serves to facilitate bending of the planar glass sheet 12 by pivoting the first planar housing 14 in relation to the second planar housing 16 and extending the lateral distance therebetween, thus preventing buckling of the planar glass sheet 12.

The slider element 40 is a piece of spring sheet metal that is fixedly attached to the first holder 26 via the first clamp 36 and accompanying fasteners. In one embodiment, the slider element 40 is 0.3 mm thick. The slider element 40 is slidably disposed between the second holder 28 and the second clamp 38 and accompanying fasteners. The second clamp 38 exerts a compressive force on the slider element 40 via the second holder 28, thus inducing friction to secure the slider element 40 in a position and thus secure the first planar housing 14 at a desired pivot angle in relation to the second planar housing 16.

The multi-link hinge assembly 20 further includes a mechanism that is arranged to limit the magnitude of the pivot angle between the first planar housing 14 and the second planar housing 16. In one embodiment, this includes a plurality of slots 50 and corresponding pins 48, wherein the pins 48 are slidably disposed in the slots 50. As shown, the slots 50 are formed in the slider element 40, and the corresponding pins 48 are formed in the second clamp 38. When the second clamp 38 is assembled onto the second holder 28 with the slider element 40 interposed, the pins 48 are inserted into the corresponding slots 50 to limit lateral movement of the slider element 40, and thus limit rotation of the first planar housing 14 in relation to the second planar housing 16. The placement, size, and orientations of the pins 48 and slots 50 are selected to limit rotation of the first planar housing 14 in relation to the second planar housing 16 based upon the maximum negative pivot angle 44 and the maximum positive pivot angle 42.

FIG. 4 is a top view of a portion of an embodiment of the compliant display assembly 10 employing the planar glass sheet 12, wherein the first planar housing 14 is joined to the second planar housing 16 via the multi-link hinge assembly 20 and is arranged at a negative rotation relative to the neutral plane 41. As shown, the multi-link hinge assembly 20 is arranged to limit the pivot angle between the first planar housing 14 and the second planar housing 16 to the maximum negative pivot angle 44 as measured from the neutral plane 41 in the second direction.

FIG. 5 is a top view of a portion of an embodiment of the compliant display assembly 10 employing the planar glass sheet 12, wherein the first planar housing 14 is joined to the second planar housing 16 via the multi-link hinge assembly 20 and is arranged at zero rotation relative to the neutral plane 41. As shown, the multi-link hinge assembly 20 is arranged such that the pivot angle between the first planar housing 14 and the second planar housing 16 is set to zero, which defines the neutral plane 41 in the first direction.

FIG. 6 is a top view of a portion of an embodiment of the compliant display assembly 10 employing the planar glass sheet 12, wherein the first planar housing 14 is joined to the second planar housing 16 via the multi-link hinge assembly 20 and is arranged at a positive rotation relative to the neutral plane 41. As shown, the multi-link hinge assembly 20 is arranged to limit the pivot angle between the first planar housing 14 and the second planar housing 16 to the maximum positive pivot angle 42 as measured from the neutral plane 41 in the first direction.

The concepts described herein provide a capability of stretching the distance between the first and second planar housings 14, 16 when folding the planar glass sheet 12 by action of the multi-link hinge assembly 20, thus removing compressive stress on the planar glass sheet 12. The concepts described herein also provide a capability of securing the position of the first planar housing 14 relative to the second planar housing 16 when folding the planar glass sheet 12 by action of the multi-link hinge assembly 20.

The following Clauses provide example configurations of the compliant display assembly 10 including the first and second planar housings 14, 16 wherein the planar glass sheet 12 is bendable via the multi-link hinge assembly 20, as disclosed herein.

Clause 1. A compliant display assembly, comprising: a glass sheet, a first housing for a first electronic display panel, a second housing for a second electronic display panel, and a hinge;

wherein the first housing is pivotably coupled to the second housing via the hinge;

wherein the glass sheet is attached to the first housing;

wherein the glass sheet is attached to the second housing;

wherein the first housing is arranged to pivot in a first direction relative to the second housing via the hinge;

wherein the first housing is arranged to pivot in a second direction relative to the second housing via the hinge;

wherein the hinge is arranged to limit a pivot angle between the first housing and the second housing to a maximum pivot angle; and wherein the hinge is arranged to secure the first housing in relation to the second housing.

Clause 2. The compliant display assembly of clause 1, wherein the hinge arranged to limit the pivot angle between the first housing and the second housing to the maximum pivot angle further comprises:

the hinge being arranged to limit the pivot angle between the first housing and the second housing to a maximum positive pivot angle in a first direction; and the hinge being arranged to limit the pivot angle between the first housing and the second housing to a maximum negative pivot angle in the second direction.

Clause 3. The compliant display assembly of any of clauses 1-2, wherein the glass sheet has a first thickness, and wherein the hinge is arranged to limit a magnitude of the pivot angle between the first housing and the second housing to the maximum pivot angle based upon the first thickness.

Clause 4. The compliant display assembly of any of clauses 1-3, comprising the glass sheet having a first thickness of 0.7 mm, and wherein the hinge is arranged to limit the magnitude of the pivot angle between the first housing and the second housing to a maximum negative pivot angle of −5° in a first direction and a maximum positive pivot angle of +15° in the second direction.

Clause 5. The compliant display assembly of any of clauses 1-4, wherein the hinge is arranged to permit bending of the glass sheet without buckling.

Clause 6. The compliant display assembly of any of clauses 1-5, wherein the maximum pivot angle is determined based upon a minimum bending radius of the glass sheet.

Clause 7. The compliant display assembly of any of clauses 1-6, further comprising a first electronic display panel interposed between a first portion of the glass sheet and the first housing, and a second electronic display panel interposed between a second portion of the glass sheet and the second housing.

Clause 8. The compliant display assembly of any of clauses 1-7, wherein the hinge is interposed between the first housing and the second housing, and wherein a magnitude of width of the hinge is determined based upon a minimum bending radius of the glass sheet.

Clause 9. The compliant display assembly of any of clauses 1-8, wherein the hinge includes a first link, a second link, a first holder, a second holder, a first clamp, a second clamp, and a slider element;

wherein the first holder is attached to the first housing;

wherein the second holder is attached to the second housing;

wherein the first link is pivotably attached to the first holder at a first axis of rotation;

wherein the first link is pivotably attached to the second link at a second axis of rotation;

wherein the second link is pivotably attached to the second holder at a third axis of rotation;

wherein the slider element is attached to the first holder via a first clamp;

wherein the slider element is slidably disposed on the second holder via a second clamp; and wherein the slider element, the second holder and the second clamp interact to secure the first housing in relation to the second housing.

Clause 10. The compliant display assembly of any of clauses 1-9, wherein the hinge further comprises a mechanism arranged to limit a magnitude of the pivot angle between the first housing and the second housing.

Clause 11. The compliant display assembly of any of clauses 1-10, wherein the mechanism arranged to limit the magnitude of the pivot angle between the first housing and the second housing comprises a pin slidably disposed in a slot, wherein the pin is disposed on the second clamp and the slot is disposed on the slider element.

Clause 12. The compliant display assembly of any of clauses 1-11, wherein the glass sheet comprises a single glass sheet, wherein a first portion of the single glass sheet is attached to the first housing, and wherein a second portion of the single glass sheet is attached to the second housing.

Clause 13. A compliant display assembly, comprising:

a planar glass sheet, a first planar housing, a second planar housing, and a multi-link hinge assembly;

wherein the first planar housing is pivotably coupled to the second planar housing via the multi-link hinge assembly;

wherein the planar glass sheet includes a single planar glass sheet, wherein a first portion of the single planar glass sheet is attached to the first planar housing, and wherein a second portion of the single planar glass sheet is attached to the second planar housing;

wherein the first planar housing is arranged to pivot relative to the second planar housing via the multi-link hinge assembly;

wherein the multi-link hinge assembly is arranged to limit a pivot angle between the first planar housing and the second planar housing to a maximum pivot angle; and wherein the multi-link hinge assembly is arranged to secure the first planar housing in relation to the second planar housing.

Clause 14. The compliant display assembly of clause 13, wherein the multi-link hinge assembly arranged to limit the pivot angle between the first planar housing and the second planar housing to the maximum pivot angle further comprises:

the multi-link hinge assembly arranged to limit the pivot angle between the first planar housing and the second planar housing to a maximum positive pivot angle in a first direction; and the multi-link hinge assembly arranged to limit the pivot angle between the first planar housing and the second planar housing to a maximum negative pivot angle in a second direction.

Clause 15. The compliant display assembly of any of clauses 13-14, wherein the multi-link hinge assembly includes a first link, a second link, a first holder, a second holder, a first clamp, a second clamp, and a slider element;

wherein the first holder is attached to the first planar housing;

wherein the second holder is attached to the second planar housing;

wherein the first link is pivotably attached to the first holder at a first axis of rotation;

wherein the first link is pivotably attached to the second link at a second axis of rotation;

wherein the second link is pivotably attached to the second holder at a third axis of rotation;

wherein the slider element is attached to the first holder via a first clamp;

wherein the slider element is slidably disposed on the second holder via a second clamp; and wherein the slider element, the second holder and the second clamp interact to secure the first planar housing in relation to the second planar housing.

Clause 16. The compliant display assembly of any of clauses 13-15, wherein the multi-link hinge assembly further comprises a mechanism arranged to limit a magnitude of the pivot angle between the first planar housing and the second planar housing.

Clause 17. The compliant display assembly of any of clauses 13-16, wherein the mechanism arranged to limit the magnitude of the pivot angle between the first planar housing and the second planar housing comprises a pin slidably disposed in a slot, wherein the pin is disposed on the second clamp and the slot is disposed on the slider element.

Clause 18. The compliant display assembly of any of clauses 13-17, wherein the planar glass sheet has a first thickness, and wherein the multi-link hinge assembly is arranged to limit the magnitude of the pivot angle between the first planar housing and the second planar housing to the maximum pivot angle based upon the first thickness.

Clause 19. The compliant display assembly of any of clauses 13-18, comprising the planar glass sheet having a first thickness of 0.7 mm, and wherein the multi-link hinge assembly is arranged to limit the magnitude of the pivot angle between the first planar housing and the second planar housing to a maximum negative pivot angle of −5° in a first direction and a maximum positive pivot angle of +15° in a second direction.

Clause 20. The compliant display assembly of any of clauses 13-19, wherein the multi-link hinge assembly is interposed between the first planar housing and the second planar housing, and wherein a magnitude of width of the multi-link hinge assembly is determined based upon a minimum bending radius of the planar glass sheet.

The foregoing detailed description and the drawings are supportive and descriptive of the disclosure. As will be appreciated by those of ordinary skill in the art, various alternative designs and embodiments may exist for practicing the disclosure.

The invention claimed is:

1. A compliant display assembly, comprising:
a glass sheet, a first housing for a first electronic display panel, a second housing for a second electronic display panel, and a hinge;
wherein the first housing is pivotably coupled to the second housing via the hinge;
wherein the glass sheet is attached to the first housing;
wherein the glass sheet is attached to the second housing;
wherein the first housing is arranged to pivot in a first direction relative to the second housing via the hinge;
wherein the first housing is arranged to pivot in a second direction relative to the second housing via the hinge;
wherein the hinge is arranged to limit a pivot angle between the first housing and the second housing to a maximum pivot angle; and
wherein the glass sheet has a first thickness, and wherein the hinge is arranged to limit a magnitude of the pivot angle between the first housing and the second housing to the maximum pivot angle based upon the first thickness.

2. The compliant display assembly of claim 1, wherein the hinge arranged to limit the pivot angle between the first housing and the second housing to the maximum pivot angle further comprises:
the hinge being arranged to limit the pivot angle between the first housing and the second housing to a maximum positive pivot angle in the first direction; and
the hinge being arranged to limit the pivot angle between the first housing and the second housing to a maximum negative pivot angle in the second direction.

3. The compliant display assembly of claim 1, comprising the glass sheet having a first thickness of 0.7 mm, and wherein the hinge is arranged to limit the magnitude of the pivot angle between the first housing and the second housing to a maximum negative pivot angle of −5° in the first direction and a maximum positive pivot angle of +15° in the second direction.

4. The compliant display assembly of claim 1, wherein the hinge is arranged to permit bending of the glass sheet without buckling.

5. The compliant display assembly of claim 1, wherein the maximum pivot angle is determined based upon a minimum bending radius of the glass sheet.

6. The compliant display assembly of claim 1, further comprising the first electronic display panel interposed between a first portion of the glass sheet and the first housing, and the second electronic display panel interposed between a second portion of the glass sheet and the second housing.

7. The compliant display assembly of claim 1, wherein the hinge is interposed between the first housing and the second housing, and wherein a magnitude of width of the hinge is determined based upon a minimum bending radius of the glass sheet.

8. A compliant display assembly, comprising:
a glass sheet, a first housing for a first electronic display panel, a second housing for a second electronic display panel, and a hinge;
wherein the first housing is pivotably coupled to the second housing via the hinge;
wherein the glass sheet is attached to the first housing;
wherein the glass sheet is attached to the second housing;
wherein the first housing is arranged to pivot in a first direction relative to the second housing via the hinge;
wherein the first housing is arranged to pivot in a second direction relative to the second housing via the hinge;
wherein the hinge is arranged to limit a pivot angle between the first housing and the second housing to a maximum pivot angle;
wherein the hinge is a multi-link hinge assembly that includes a first link, a second link, a first holder, a second holder, a first clamp, a second clamp, and a slider element;
wherein the first holder is attached to the first housing;
wherein the second holder is attached to the second housing;
wherein the first link is pivotably attached to the first holder at a first axis of rotation;
wherein the first link is pivotably attached to the second link at a second axis of rotation;
wherein the second link is pivotably attached to the second holder at a third axis of rotation;
wherein the slider element is attached to the first holder via a first clamp;
wherein the slider element is slidably disposed on the second holder via a second clamp; and
wherein the slider element, the second holder and the second clamp interact to secure the first housing in relation to the second housing.

9. The compliant display assembly of claim 8, wherein the hinge further comprises a mechanism arranged to limit a magnitude of the pivot angle between the first housing and the second housing.

10. The compliant display assembly of claim 9, wherein the mechanism arranged to limit the magnitude of the pivot angle between the first housing and the second housing comprises a pin slidably disposed in a slot, wherein the pin is disposed on the second clamp and the slot is disposed on the slider element.

11. The compliant display assembly of claim 1, wherein the glass sheet comprises a single glass sheet, wherein a first portion of the single glass sheet is attached to the first housing, and wherein a second portion of the single glass sheet is attached to the second housing.

12. A compliant display assembly for a vehicle, the compliant display assembly comprising:

a planar glass sheet, a first planar housing for a first electronic display panel, a second planar housing for a second electronic display panel, and a multi-link hinge assembly;

wherein the first planar housing is pivotably coupled to the second planar housing via the multi-link hinge assembly;

wherein the planar glass sheet includes a single planar glass sheet, wherein a first portion of the single planar glass sheet is attached to the first planar housing, and wherein a second portion of the single planar glass sheet is attached to the second planar housing;

wherein the first planar housing is arranged to pivot relative to the second planar housing via the multi-link hinge assembly;

wherein the multi-link hinge assembly is arranged to limit a pivot angle between the first planar housing and the second planar housing to a maximum pivot angle, including the multi-link hinge assembly being arranged to limit the pivot angle between the first planar housing and the second planar housing to a maximum positive pivot angle in a first direction, and the multi-link hinge assembly arranged to limit the pivot angle between the first planar housing and the second planar housing to a maximum negative pivot angle in a second direction;

wherein the multi-link hinge assembly is arranged to secure the first planar housing in relation to the second planar housing; and wherein the multi-link hinge assembly includes a first link, a second link, a first holder, a second holder, a first clamp, a second clamp, and a slider element, including:
  wherein the first holder is attached to the first planar housing,
  wherein the second holder is attached to the second planar housing,
  wherein the first link is pivotably attached to the first holder at a first axis of rotation,
  wherein the first link is pivotably attached to the second link at a second axis of rotation,
  wherein the second link is pivotably attached to the second holder at a third axis of rotation,
  wherein the slider element is attached to the first holder via a first clamp,
  wherein the slider element is slidably disposed on the second holder via a second clamp, and
  wherein the slider element, the second holder and the second clamp interact to secure the first planar housing in relation to the second planar housing.

13. The compliant display assembly of claim 12, wherein the multi-link hinge assembly further comprises a mechanism arranged to limit a magnitude of the pivot angle between the first planar housing and the second planar housing.

14. The compliant display assembly of claim 13, wherein the mechanism arranged to limit the magnitude of the pivot angle between the first planar housing and the second planar housing comprises a pin slidably disposed in a slot, wherein the pin is disposed on the second clamp and the slot is disposed on the slider element.

15. The compliant display assembly of claim 14, wherein the planar glass sheet has a first thickness, and wherein the multi-link hinge assembly is arranged to limit the magnitude of the pivot angle between the first planar housing and the second planar housing to the maximum pivot angle based upon the first thickness.

16. The compliant display assembly of claim 15, comprising the planar glass sheet having a first thickness of 0.7 mm, and wherein the multi-link hinge assembly is arranged to limit the magnitude of the pivot angle between the first planar housing and the second planar housing to a maximum negative pivot angle of −5° in a first direction and a maximum positive pivot angle of +15° in a second, opposite direction.

17. The compliant display assembly of claim 12, wherein the multi-link hinge assembly is interposed between the first planar housing and the second planar housing, and wherein a magnitude of width of the multi-link hinge assembly is determined based upon a minimum bending radius of the planar glass sheet.

18. The compliant display assembly of claim 8, wherein the hinge is interposed between the first housing and the second housing, and wherein a magnitude of width of the hinge is determined based upon a minimum bending radius of the glass sheet.

19. The compliant display assembly of claim 8, wherein the maximum pivot angle is determined based upon a minimum bending radius of the glass sheet.

20. The compliant display assembly of claim 8, further comprising the first electronic display panel interposed between a first portion of the glass sheet and the first housing, and the second electronic display panel interposed between a second portion of the glass sheet and the second housing.

* * * * *